Dec. 9, 1941.      B. E. SHAW      2,265,496
PILOT VALVE
Filed May 13, 1940
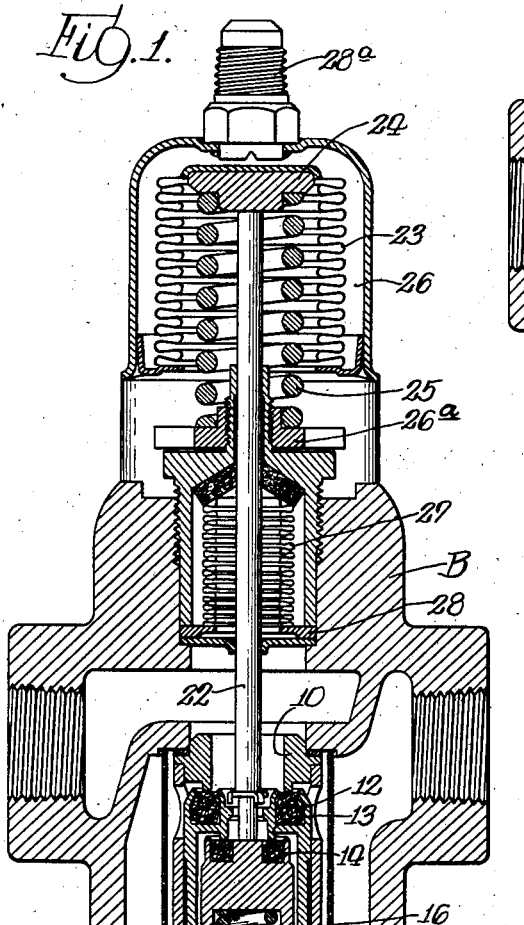
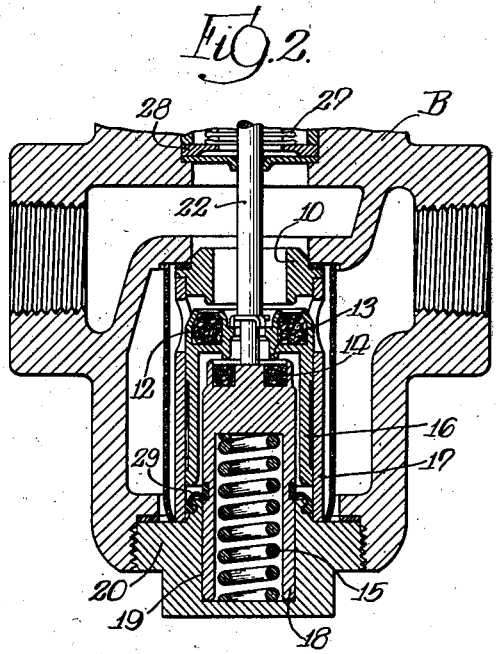
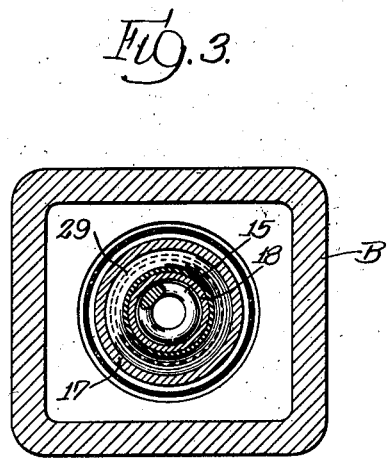
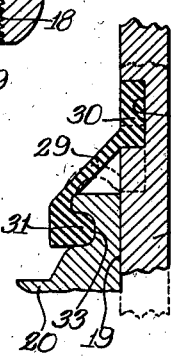
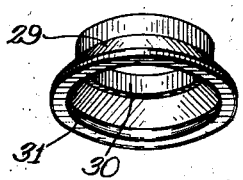
INVENTOR.
Burton E. Shaw,
BY Bair & Freeman
ATTORNEYS.

Patented Dec. 9, 1941

2,265,496

UNITED STATES PATENT OFFICE 2,265,496

PILOT VALVE

Burton E. Shaw, Bristol, Ind., assignor to Penn Electric Switch Co., Goshen, Ind., a corporation of Iowa Application May 13, 1940, Serial No. 334,873

2 Claims. (Cl. 277—43)

My present invention relates to a valve structure such as one of the "pilot" type, wherein means is provided to effectively seal the sliding surfaces of the guide means of the pilot valve to prevent liming and sedimentation interfering with the action thereof.

One object of the invention is to provide an effective yet simple and inexpensive sealing device for effecting a seal between a tubular guide of a pilot valve and the valve body.

Another object is to provide a seal which is in the form of a diaphragm formed of resilient material such as neoprene or rubber, the diaphragm having a pair of annular beads received in grooves of the valve body and the valve guide means, the diaphragm portion permitting movement of the guide relative to the valve body with a mere flexing of the diaphragm to permit of such movement being entirely free and unhampered by the presence of the diaphragm.

Another object is to provide sealing means for a sliding portion of a valve and the valve body itself consisting of a truncated cone-shaped diaphragm having annular beads at its ends, a valve guide and a portion of the valve body having grooves to receive the beads.

With these and other objects in view, my invention consists in the construction, arrangement and combination of the various parts of my device whereby the objects contemplated are attained, as hereinafter more fully set forth, pointed out in my claims and illustrated in the accompanying drawing, in which:

Figure 1 is a vertical sectional view through a pilot valve structure embodying my invention.

Figure 2 is a similar view of the lower portion of Figure 1 showing the parts in a different position.

Figure 3 is a sectional view on the line 3—3 of Figure 1.

Figure 4 is an enlarged sectional view of a portion of Figure 1 showing a dotted position for comparison.

Figure 5 is a perspective view of the sealing diaphragm of my structure.

Heretofore in valve structures through which water or other fluid passes, trouble has been experienced with liming or sedimentation collecting on sliding surfaces within the valve structure which interfere with free action of the valve. This is particularly true in the case of pilot valve structures wherein the pilot valve is ordinarily provided with a tubular portion telescopically slidable in a bore of the valve body, the tubular portion and the bore being subject to water flowing through the valve and thereby subject to any liming or sediment deposits from the flowing water. Such deposits interfere with the free action of the valve particularly where the valve is controlled by a pressure responsive bellows or the like, which bellows has comparatively small power to operate the valve and which power is usually insufficient to properly operate the valve when the sliding surfaces thereof are limed or coated with other sedimentation.

By way of illustration I show a valve structure including a body B having therein a main valve seat 10. A main valve 12 is adapted to seat against the seat 10 and includes a pilot valve seat 13 for a pilot valve 14 to seat against. A spring 15 is provided to seat the valves 12 and 14.

The main valve 12 has a tubular extension 16 telescopically guided in a sleeve 17. The pilot valve 14 has a tubular extension 18 telescopically guided for sliding movement in a bore 19 of the valve body. The bore 19 may be formed in a separate removable plug 20 if desired.

For operating the valves 14 and 12 a stem 22 is illustrated which in turn is operatively connected with a pressure responsive bellows 23 by contact with the head 24 thereof. A spring 25 opposes pressure within a bellows housing 26 surrounding the bellows 23 and an adjusting nut 26a is provided for changing the tension of the spring 25 if desired. The stem 22 is sealed relative to the valve body B by means of a bellows 27 having its upper end soldered or otherwise secured to the stem 22 and its lower end soldered to a washer 28.

A fitting 28a is connected with the housing 26 and may in turn be connected by a copper tube or the like to a source of pressure such as the refrigerant line of a refrigerant system wherein the pilot valve is connected with a source of water supply to admit water to the condenser of the system only when the refrigerant compressor motor is in operation.

The specific invention herein disclosed consists of a truncated cone-shaped diaphragm 29 having an upper bead 30 and a lower bead 31. The diaphragm 29 surrounds the tubular extension 18 of the pilot valve 14, which extension is provided with an annular groove 32 to receive the annular bead 30. The closure plug 20 is also provided with a groove 33 surrounding the bore 19 therein and the groove 33 receives the bead 31. The diaphragm 29 together with its beads 30 and 31 are formed initially of such size that the beads 30 and 31 must be expanded to fit within the grooves 32 and 33. The diaphragm is thus held in position due to its inherent resiliency and the resiliency of the beads effectively seals them with respect to the grooves in which they fit.

When the valve structure is closed as in Fig. 1, the sealing member may assume its normal shape. When the valve opens, the bead 30 is carried downwardly with respect to the bead 31 as shown in Figure 2 and as shown by dotted lines in Figure 4. Accordingly this action flexes or bends the diaphragm 29 as illustrated, thereby retaining the seal between the pilot valve extension 18 and the closure nut 20 of the valve body.

Although there may be some seepage of the water into the bore 19, the diaphragm 29 effectively prevents a constant washing of water across the outer sliding surface of the extension 18 and thereby prevents the deposit of an ever-increasing thickness of lime or other sedimentation thereon.

The delicate sliding action of the pilot valve is therefore guarded against interference with the use of a very simple molded member of neoprene or the like which can be readily assembled in position and will entirely eliminate a source of trouble common in many valve structures and especially those of the pilot type.

Some changes may be made in the construction and arrangement of the parts of my device without departing from the real spirit and purpose of my invention, and it is my intention to cover by my claims any modified forms of structure, or use of mechanical equivalents, which may be reasonably included within their scope.

I claim as my invention:

1. In a pilot valve structure, a valve body, a main valve seat therein, a main valve for seating against said main valve seat, telescopic tubular means for guiding said main valve, a pilot seat in said main valve, a pilot valve for seating thereagainst, telescopic tubular means for guiding said pilot valve comprising a tubular extension from the pilot valve, said valve body including a bore to slidably receive said tubular extension, a spring in said tubular extension and said bore to bias said pilot valve toward closed position, said tubular extension having an external groove therein, said valve body having a groove surrounding said bore and means for sealing the space between said tubular extension and said valve body comprising a truncated cone-shaped diaphragm of resilient material surrounding said tubular extension and having a pair of annular beads, one of said annular beads being received in the groove of said valve body and the other of said annular beads being received in the groove of said tubular extension.

2. In a pilot valve structure, a valve body, a main valve seat therein, a main valve for seating against said main valve seat, a pilot seat in said main valve, a pilot valve for seating thereagainst, telescopic means for guiding said pilot valve comprising an extension from the pilot valve, said valve body including a bore to slidably receive said extension, said extension having an external groove therein, said valve body including a groove surrounding said bore and means for sealing the space between said tubular extension and said valve body comprising a washer-shaped diaphragm of resilient material surrounding said extension and having one edge received in the groove of said valve body and its other edge received in the groove of said extension.

BURTON E. SHAW.